United States Patent
Schmid

(10) Patent No.: US 6,752,695 B2
(45) Date of Patent: Jun. 22, 2004

(54) PROCESS FOR THE MODIFICATION OF TOOTH TRACES AND/OR FOR THE CORRECTION OF TOOTH TRACE DEVIATIONS OF A GEAR

(75) Inventor: Roland Schmid, Wil (CH)

(73) Assignee: Reishauer AG, Wallisellen (CH)

(*) Notice: Subject to any disclaimer, the term of this patent is extended or adjusted under 35 U.S.C. 154(b) by 0 days.

(21) Appl. No.: 10/373,784

(22) Filed: Feb. 27, 2003

(65) Prior Publication Data

US 2003/0166377 A1 Sep. 4, 2003

(30) Foreign Application Priority Data

Feb. 27, 2002 (DE) .......................................... 102 08 531

(51) Int. Cl.[7] .................................................. B24B 1/00
(52) U.S. Cl. ............................... 451/47; 451/10; 451/11
(58) Field of Search ............................. 451/47, 5, 8, 9, 451/10, 11

(56) References Cited

U.S. PATENT DOCUMENTS

| | | | |
|---|---|---|---|
| 4,850,155 A | | 7/1989 | Sulzer |
| 4,865,497 A | * | 9/1989 | Faulstich ...................... 409/12 |
| 4,955,163 A | * | 9/1990 | Sommer |
| 5,954,568 A | * | 9/1999 | Wirz ........................... 451/47 |
| 6,077,150 A | | 6/2000 | Jankowski |
| 6,422,924 B1 | * | 7/2002 | Faulstich et al. ............. 451/47 |

FOREIGN PATENT DOCUMENTS

| | | |
|---|---|---|
| DE | 11 55 660 A | 10/1963 |
| DE | 37 04 607 A1 | 8/1988 |
| DE | 199 59 836 A1 | 6/2001 |
| JP | 60080520 A | 5/1985 |

* cited by examiner

*Primary Examiner*—Eileen P. Morgan
(74) *Attorney, Agent, or Firm*—Browdy and Neimark, P.L.L.C.

(57) ABSTRACT

In the continuous generation grinding of a gear the modifications of tooth trace contours and/or corrections of tooth trace deviations determined by flank measurement are specified separately for the left and right flanks (3, 4) of the gear (1). By means of these data, supplementary motions of the NC machine axes across the face width of the left flank (3) and the right flank (4) of the gear (1) are calculated in a control system of a gear flank grinding machine, by means of which a grinding worm produces the specified modified or deviation corrected tooth traces on the left flanks (3) and the right flanks (4) of the gear (1) in one and the same grinding stroke.

11 Claims, 2 Drawing Sheets

PROCESS FOR THE MODIFICATION OF TOOTH TRACES AND/OR FOR THE CORRECTION OF TOOTH TRACE DEVIATIONS OF A GEAR

TECHNICAL FIELD

The invention concerns a process for the modification of tooth traces and/or for the correction of tooth trace deviations of a gear by the continuous generation grinding of the tooth flanks of the gear in accordance with the generalities of the patent claim 1.

BACKGROUND OF THE INVENTION

With respect to load capacity and noise development, modern high capacity gear drive units are subjected to ever more stringent requirements. In many cases, in order to fulfill these requirements, the grinding of gears no longer provides them with a truly involute tooth flank form, but with a purposely modified flank geometry. These modifications are designed such that under operating conditions they have a positive influence on the loading and quiet running of the gear drive. The resulting demand made on a modern gear flank grinding machine is that the flank modifications specified by the gear designer can be programmed as simply as possible and generated with high precision. The same requirement prevails for the input and execution of the correction of machine and setting related flank geometry deviations after gear tooth inspection on a gear measuring machine.

Due to the mostly differing functions of the left and right tooth flanks, e.g. as working or non-working flank, different tooth trace contours are frequently desired on the left and right flanks. A more pronounced crowning, for example, can be demanded for the non-working flank than for the working flank. Similarly after gear measurement, the tooth trace corrections to be undertaken across the face width on the left and right flanks frequently do not have the same contour. A further demand made of a modern gear grinding machine, therefore, is that the desired flank modifications and corrections of flank geometry deviations can be entered separately for the left and right flanks.

A known process for the manufacture of gears is the double flank continuous generation grinding with a cylindrical grinding worm. In this process, during the grinding stroke the two flanks of the thread of the grinding worm engage with the two gear flanks simultaneously at two points of contact lying opposite each other in the normal plane. If here the grinding stroke of the grinding worm takes place parallel to the gear axis at a constant coupling ratio between grinding worm and gear rotations, the tooth traces produced on the gear's left and right flanks are straight and mutually parallel. For the modification of tooth traces, these straight lines are usually used as reference. The modification can thus be defined as the deviation off a non-modified tooth trace across the face width of the gear.

DE 197 06 867.7 shows one of the possible methods of producing tooth trace modifications by continuous tooth flank generation grinding. With this method the grinding worm employed is adapted according to the gear modification desired. That is to say that flank geometry of the grinding worm is modified in the lead direction of the grinding worm thread, such that by axial shifting of the grinding worm during the grinding stroke, i.e. during passage through the workpiece tooth space, the desired tooth trace modification is formed by conjugate reproduction of the modified flank form of the grinding worm on the workpiece tooth flank. This process is expensive, however, as for every modification the appropriate matching grinding worm geometry must be produced beforehand, and reproduced with every dressing operation.

In another more widespread method, to which the present invention is also related, supplementary motions of a magnitude corresponding to the desired modifications are purposefully superimposed on that relative motion between grinding worm and gear needed to grind non-modified tooth flanks. These supplementary motions are produced by NC axes of the machine which are suitable for the purpose. By altering the centre distance between grinding worm and gear, and by tangentially shifting the grinding worm, it is possible to shift the tooth space width and respectively the angular position of both tooth flanks, i.e. the tooth space centre, in the direction of rotation of the gear. The latter can also be achieved by means of a suitable supplementary rotation of the gear relative to the grinding worm within the generative coupling incorporated between the two elements.

This method affords a greater flexibility. Also of advantage is that the same NC machine axes can be used for the modifications as are used for the continuous generation grinding of the gear. Additional resources for the adaptation of the grinding worm thread geometry are dispensed with. In practice however, cases are also to be encountered which make combined use of both of the methods described above.

The method last described has the disadvantage, however, that the supplementary motions of the NC axes which produce the modifications of the tooth traces are effective on both tooth flanks simultaneously, because the grinding worm is in contact with both flanks of the gear at once. Therefore the tooth traces of the left and right flanks cannot be altered independently of each other. Hence the requirement initially mentioned, namely that the desired flank modifications and corrections of flank geometry deviations can be entered for the left and right flanks separately, is not fulfilled.

For example, by altering the centre distance between grinding worm and gear in a circular arc relationship across the face width, this process produces crowning of equal magnitude on both flanks. Moreover in the case of helical gears, the apex points are mutually offset in the longitudinal direction by an amount equal to the offset of the points of contact of the grinding worm thread on the left and right flanks. Likewise rotary displacements between the grinding worm and the gear within the generative coupling during passage through the tooth space produce directional changes of the tooth traces of equal magnitude on both workpiece tooth flanks, but of opposite algebraic sign. The same applies for axial displacements of the grinding worm relative to the gear.

For simple, frequently occurring form elements of tooth trace modification such as crowning, end relief and helix angle alterations on both flanks, this method may suffice. For more intricate form elements and higher standards, however, it is inflexible, and its implementation is complicated, untransparent, and tedious and exacting for the setter or operator, so that the risk of error is increased.

SUMMARY OF THE INVENTION

The objective of the invention is therefore to create a process which obviates the above-mentioned disadvantages.

This objective is achieved with a process having the characteristics of patent claim 1.

In the process according to the invention, tooth trace modifications and/or corrections of tooth trace deviations are defined separately for the left and the right flank. From these separate sided entries for modifications and/or deviation corrections, supplementary motions of the NC axes of a tooth flank grinding machine are calculated and performed during the grinding stroke. These supplementary motions cause supplementary displacements between the grinding worm and the gear in various directions of motion. Thus the desired left and right hand tooth trace modifications and/or tooth trace corrections are realized on the gear in one and the same grinding stroke.

Therein motions in a first direction of motion take effect on the left and right flank symmetrically with the same algebraic sign, e.g. a radial infeed of the grinding worm. Motions in a second direction of motion take effect on the left and right flank symmetrically, but with opposite algebraic signs, e.g. a relative rotation between grinding worm and gear within the generative coupling, or an appropriate linear displacement of grinding worm and gear relative to each other.

The process according to the invention permits in an efficient manner modified tooth trace contours as well as corrections of tooth trace deviations to be realized in a single common grinding stroke, and nevertheless to address modifications and corrections separately from each other and appropriately hand related.

Further advantageous variants of the process are expressed in the dependent claims.

BRIEF DESCRIPTION OF THE DRAWINGS

In the following the subject of the invention is explained with reference to preferred implementation examples which are represented in the annexed drawings. These depict.

DETAILED DESCRIPTION OF PREFERRED EMBODIMENTS

The process according to the invention is described in the following with reference to a gear which is to be machined on a gear grinding machine by continuous generation grinding with a cylindrical grinding worm. This is to provide the left and right flanks of the gear with different, arbitrarily selected modifications and/or corrections of deviations of the tooth traces.

Figure 1:
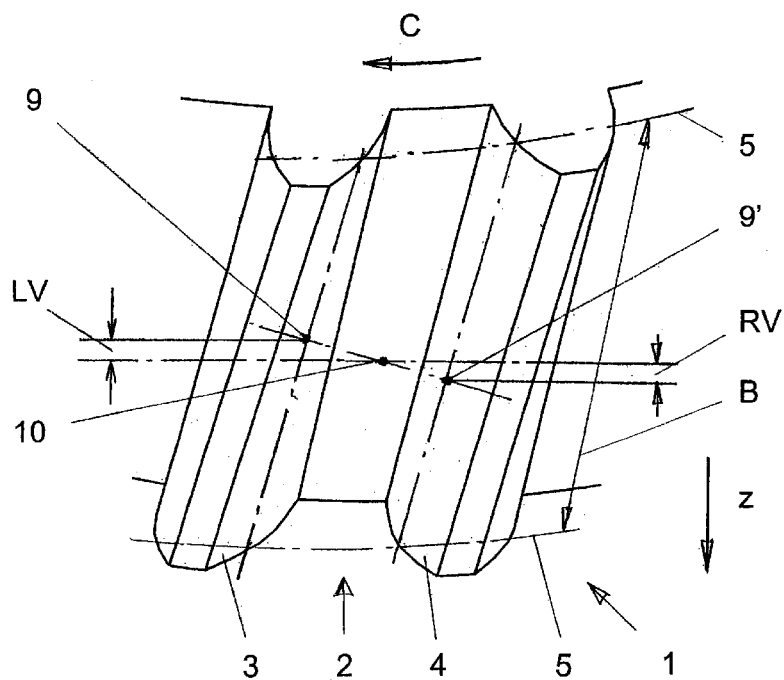
FIG. 1 A diagrammatic illustration of the tooth space of a gear.

FIG. 1 depicts diagrammatically a tooth space 2 of the gear 1 with one each left flank 3 and one right flank 4. During the continuous generation grinding the gear 1 is rotated relative to the grinding worm. Its direction of rotation is denoted in FIG. 1 by C. Z denotes the direction of the grinding stroke relative to the grinding worm. The reference number 9 denotes the point of contact between the grinding worm and the left flank 3 during grinding, 9' the point of contact between the grinding worm and the right flank 4. The reference number 5 denotes the pitch circle of generation.

In the case of a helical gear, such as is represented in FIG. 1, these points of contact 9, 9' are axially offset relative to the mid-point 10 of the straight line joining the points of contact 9 and 9'. This offset is denoted by VL for the left flank 3 and VR for the right flank 4.

In the following the invention related modification of the contours of the tooth traces of the gear 1 is described. This is applied e.g. to the pitch circle of generation 5, as is customary in practice.

Figure 2A:
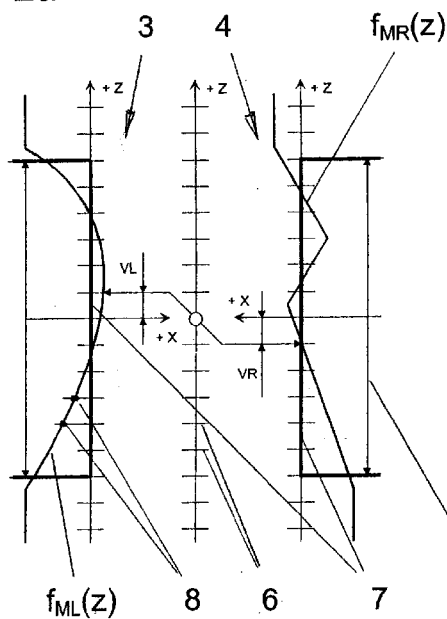
FIG. 2a Tooth trace modifications of a left and right flank of a gear.
Figure 3:
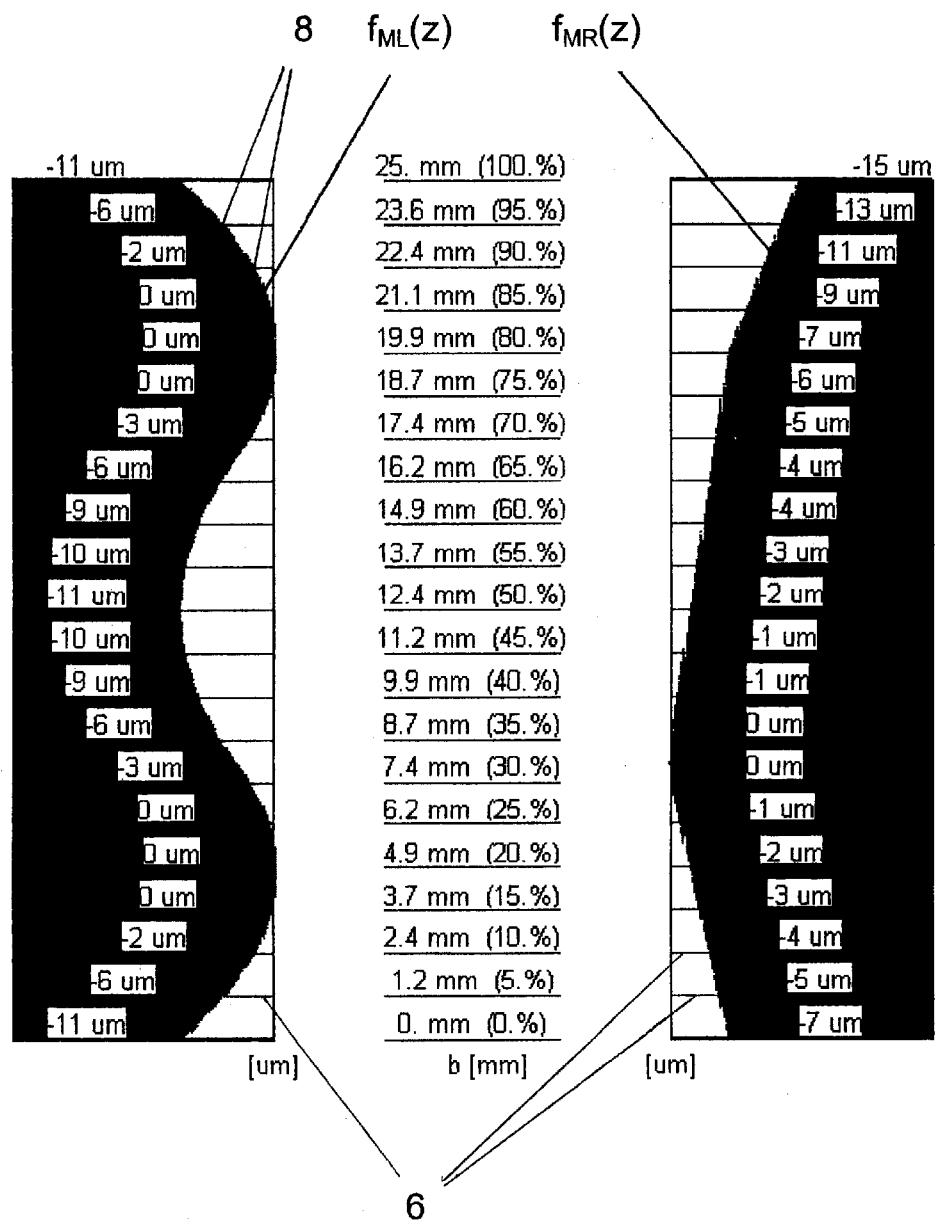

As stated at the outset, non-modified tooth traces 7 are represented as vertical straight lines, as shown in FIG. 2a. Usually the modified tooth trace contours across the face width are specified on a workpiece drawing. For example they are specified in numerical values in the direction of rotation C of the gear 1 on transverse planes 6 as indicated in FIG. 3, the transverse planes 6 being distributed across the face width B at uniform distances in the grinding stroke direction Z. From this the desired tooth trace modifications for the left flank 3 and the right flank 4 are calculated. The modifications are represented as modification functions $f_{ML}$ and $f_{MR}$, which describe the deviations off the non-modified tooth traces 7.

If the deviations can be described by geometrically simple form elements such as straight lines and circular arcs, it is sufficient to enter their geometrical characteristics on display masks provided for the purpose, in order to allow the machine control system to derive the appropriate modification functions $f_{ML}$ and $f_{MR}$ automatically. These modification functions $f_{ML}$ and $f_{MR}$ are subsequently digitalized with adequate resolution on the basis of a deviation limit of 0.1 $\mu$m for example. In the case of more complicated forms, individual plotting points 8 are selected for which the data are entered.

In accordance with the invention, using the modification functions $f_{ML}$ and $f_{MR}$ or the entered data, the formulae $$f_{x,M}(z) = \{f_{ML}(z \pm VL) + f_{MR}(z \pm VL)\}/2$$

and $$f_{C,M}(z) = \{f_{ML}(z \pm VL) - f_{MR}(z \pm VL)\}/2$$

are applied to derive the supplementary motions of the NC machine axes which are suitable for producing the specified tooth flank modification. From this it is possible to determine the necessary actual NC axes motions by means of equidistant calculation by the usual mathematical procedure. In the equations stated above, z denotes the grinding stroke position of the grinding worm as it passes through the tooth space 2 in the grinding stroke direction Z, and the functions

| | |
|---|---|
| $f_{ML}(z)$ | The modified desired tooth trace contour of the left flank 3, |
| $f_{MR}(z)$ | The modified desired tooth trace contour of the right flank 4, |
| $f_{X,M}(z)$ | The locus of a centre distance alteration between the grinding worm and the gear 1 performed by means of the supplementary motions of the NC axes, and |
| $f_{C,M}(z)$ | The locus of a rotation of the grinding worm relative to the gear 1 within the generative coupling performed by means of the supplementary motions of the NC axes | in relation to the grinding position z.

Figure 2B:
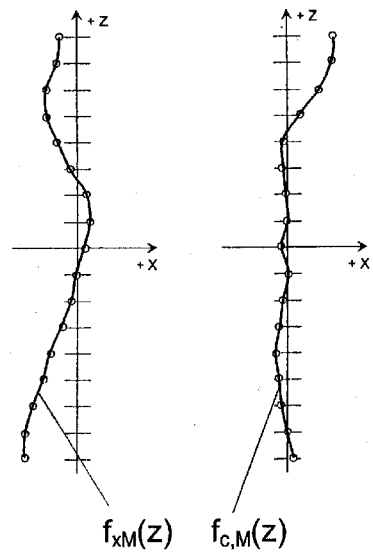
FIG. 2b Supplementary motions of NC machine axes resulting from the tooth trace modifications according to FIG. 2a, and FIG. 3 A display mask for differing tooth trace modifications on the left and right flank of the gear.

Depicted in FIG. 2 are arbitrarily assumed tooth trace modifications $f_{ML}(z)$ and $f_{MR}(z)$ and the locus curves $f_{x,M}(z)$ and $f_{C,M}(z)$ resulting from the above formulae.

The correction of a deviation of the tooth trace from the desired contour follows the same principle:

The deviation is usually determined by customary means via tooth flank measurement, and documented in a test result diagram. The correction values necessary for the correction are entered for the transverse planes 6, and appropriate functions $f_{KL}(z)$ and $f_{KR}(z)$ for the deviation correction of the tooth trace contours of the left and right flanks calculated. In accordance with the invention, from these correction functions $f_{KL}(z)$ and $f_{KR}(z)$ the equations $$f_{x,K}(z) = \{f_{KL}(z \pm VL) + f_{KR}(z \pm VL)\}/2$$

and $$f_{C,K}(z) = \{f_{KL}(z \pm VL) - f_{KR}(z \pm VL)\}/2$$

now permit the calculation of the supplementary motions of the NC machine axes, the denotation of the functions being

| | |
|---|---|
| $f_{X,K}(z)$ | The locus of a centre distance alteration between grinding worm and gear 1 performed by means of the supplementary motions of the NC axes, |
| $f_{C,K}(z)$ | The locus of a rotation of the grinding worm relative to the gear 1 performed by means of the supplementary motions of the NC axes, |
| $f_{KL}(z)$ | The corrected, desired tooth trace contour of the left flank 3, and |
| $f_{KR}(z)$ | The corrected, desired tooth trace contour of the right flank 4. |

In a preferred variant of the process the modification and deviation corrections of the tooth traces of the left and right flanks are superimposed simultaneously in one and the same grinding stroke. This is achieved by the addition of the functions, so that the supplementary motions of the NC motions are given by:

$$f_x(z)=f_{x,M}(z)+f_{x,K}(z)=\{f_{ML}(z\pm VL)+f_{KL}(z\pm VL)+f_{MR}(z\pm VR)+f_{KR}(z\pm VR)\}/2$$

and $$f_C(z)=f_{C,M}(z)+f_{C,K}(z)=\{f_{ML}(z\pm VL)+f_{KL}(z\pm VL)-f_{MR}(z\pm VR)-f_{KR}(z\pm VR)\}/2,$$

where the functions $f_C(z)$ and $f_x(z)$ once again denote the locus contours.

In a further possible variant of the process the data for the flank modifications and deviation corrections are not entered manually, but are handled electronically by the control system of the gear flank grinding machine. The prerequisite for this is that the control system has a suitable data interface and that the data are appropriately formatted.

In a further variant of the process, instead of the function $f_C(z)$ an equivalent linear displacement of the grinding worm relative to the gear 1 is realized, as was originally mentioned.

| | Notation |
|---|---|
| 1 | Gear |
| 2 | Tooth space |
| 3 | Left flank |
| 4 | Right flank |
| 5 | Pitch circle of generation |
| 6 | Transverse plane |
| 7 | Non-modified tooth trace |
| 8 | Plotting point |
| 9 | Point of contact of left flank |
| 9' | Point of contact of right flank |
| 10 | Mid-point of the normal joining the contact points 9, 9' |
| z | Grinding stroke position |
| Z | Grinding stroke direction |
| C | Direction of rotation of gear |
| B | Facewidth |
| VL | Contact point offset on the left flank |
| VR | Contact point offset on the right flank |
| $f_{ML}(z)$ | Modified desired tooth trace contour of the left flank |
| $f_{MR}(z)$ | Modified desired tooth trace contour of the right flank |
| $f_{KL}(z)$ | Deviation corrected tooth trace contour of the left flank relative to the non-corrected tooth trace |
| $f_{KR}(z)$ | Deviation corrected tooth trace contour of the right flank relative to the non-corrected tooth trace |
| $f_X(z)$ | Locus of the centre distance alteration between grinding worm and gear, and |
| $f_C(z)$ | Locus of the rotation of the grinding worm relative to the gear within the generative coupling |

What is claimed is:

1. Process for a modification of tooth traces and a correction of tooth trace deviations of a gear, said gear having a left and a right flank, wherein said process takes place while said gear is continuous tooth flank generation grinded using a gear flank grinding machine having NC axes and a grinding worm and wherein said modification and said correction take place by means of influencing a machine kinematics of said gear flank grinding machine, the process comprising the steps of selecting a first modification and a first correction of tooth trace deviation of said left flank of said gear;

selecting a second modification and a second correction of tooth trace deviation of said right flank of said gear independently of said first modification and said first correction;

calculating from said first and second modifications and corrections supplementary motions of said NC axes of said gear flank grinding machine as a function of a grinding stroke position superimposing said supplementary motions on a relative motion between said grinding worm of said gear flank grinding machine and said gear, thereby producing tooth traces with said first modification and said first correction on said left flank and said second modification and said second correction on said right flank of said gear in one and the same grinding stroke.

2. Process according to claim 1 in which for said first and second modifications of said tooth traces and for said first and second correction of said tooth trace deviations said supplementary motions of said NC axes are calculated employing the following formulae $$f_x(z)=\{f_{ML}(z\pm VL)+f_{KL}(z\pm VL)+f_{MR}(z\pm VR)+f_{KR}(z\pm VR)\}/2$$

and $$f_C(z)=\{f_{ML}(z\pm VL)+f_{KL}(z\pm VL)-f_{MR}(z\pm VR)-f_{KR}(z\pm VR)\}/2$$

where z denotes a grinding stroke of said grinding worm as it passes through a tooth space of said gear, and VL and VR denote an offset of points of contact between said grinding worm and said left flank and said right flank of said gear in direction of said grinding stroke and where the following functions $f_x(z)$, $f_C(z)$, $f_{KL}(z)$, $f_{KR}(z)$, $f_{x,K}(z)$, $f_{c,K}(z)$, $f_{ML}(z)$, $f_{MR}(z)$, $f_{x,M}(z)$ and $f_{c,M}(z)$ denote in relation to said grinding stroke position z, wherein

| | |
|---|---|
| $f_X(z)$ | A locus of a centre distance alteration between the grinding worm and the gear (1) performed by means of the supplementary motion of the NC axes, and |
| $f_C(z)$ | A locus of a rotation of the grinding worm relative to the gear (1) performed within a generative coupling by means of the supplementary motion of the NC axes |

3. Process according to claim 2, comprising the step of realizing said function $f_c(z)$ by an effective linear displacement of said grinding worm relative to said gear instead of realizing it by an equivalent supplementary rotation between said grinding worm and said gear within said generative coupling.

4. Process according to claim 1, comprising the step of selecting said modified tooth traces in a form of numerical values on transverse planes of said gear.

5. Process according to claim 1, comprising the step of selecting deviation corrected tooth traces in a form of numerical values on transverse planes of said gear.

6. Process according to claim 1, comprising the step of entering said modified tooth traces in form of data of electronic nature into a control system of said gear flank grinding machine.

7. Process according to claim 1, comprising the step of entering deviation corrected tooth traces in form of data of electronic nature into a control system of said gear flank grinding machine.

8. Process for a modification of tooth traces of a gear, said gear having a left and a right flank, wherein said process takes place while said gear is continuous tooth flank generation grinded using a gear flank grinding machine having NC axes and a grinding worm and wherein said modification takes place by means of influencing a machine kinematics of said gear flank grinding machine, the process comprising the steps of selecting a first modification of said left flank of said gear;

selecting a second modification of said right flank of said gear independently of said first modification;

calculating from said first and second modifications supplementary motions of said NC axes of said gear flank grinding machine as a function of a grinding stroke position;

superimposing said supplementary motions on a relative motion between said grinding worm of said gear flank grinding machine and said gear, thereby producing tooth traces with said first modification on said left flank and said second modification on said right flank of said gear in one and the same grinding stroke.

9. Process according to claim 8, in which for said first and second modifications of said tooth traces said supplementary motions of said NC axes are calculated employing the following formulae $$f_{x,M}(z)=\{f_{ML}(z\pm VL)+f_{MR}(z\pm VL)\}/2$$

and $$f_{C,M}(z)=\{f_{ML}(z\pm VL)-f_{MR}(z\pm VL)\}/2$$

where z denotes a grinding stroke of said grinding worm as it passes through a tooth space of said gear, and VL and VR denote an offset of points of contact between said grinding worm and said left flank and said right flank of said gear in direction of said grinding stroke, and where the following functions $f_{ML}(z)$, $f_{MR}(z)$, $f_{x,M}(z)$ and $f_{C,M}(z)$ denote in relation to said grinding stroke position z, wherein

| | |
|---|---|
| $f_{ML}(z)$ | The specified modified desired tooth trace contour of the left flank (3), |
| $f_{MR}(z)$ | The specified modified desired tooth trace contour of the right flank (4), |
| $f_{X,M}(z)$ | A locus of a centre distance alteration between the grinding worm and the gear (1) performed by means of the supplementary motion of the NC axes, and |
| $f_{C,M}(z)$ | A locus of a rotation of the grinding worm relative to the gear (1) within the generative coupling, performed by means of the supplementary motion of the NC axes |

10. Process for a correction of tooth trace deviations of a gear, said gear having a left and a right flank, wherein said process takes place while said gear is continuous tooth flank generation grinded using a gear flank grinding machine having NC axes and a grinding worm and wherein said correction take place by means of influencing a machine kinematics of said gear flank grinding machine, the process comprising the steps of selecting a first correction of tooth trace deviation of said left flank of said gear;

selecting a second correction of tooth trace deviation of said right flank of said gear independently of said first correction;

calculating from said first and second correction supplementary motions of said NC axes of said gear flank grinding machine as a function of a grinding stroke position superimposing said supplementary motions on a relative motion between said grinding worm of said gear flank grinding machine and said gear, thereby producing tooth traces with said first correction on said left flank and said second correction on said right flank of said gear in one and the same grinding stroke.

11. Process according to claim 10, in which for said first and second corrections of said tooth trace deviations said supplementary motions of said NC axes are calculated employing the formulae $$f_{x,K}(z)=\{f_{KL}(z\pm VL)+f_{KR}(z\pm VL)\}/2$$

and $$f_{C,K}(z)=\{f_{KL}(z\pm VL)-f_{KR}(z\pm VL)\}/2$$

where z denotes a grinding stroke of said grinding worm as it passes through a tooth space of said gear, and VL and VP. denote an offset of points of contact between said grinding worm and said left flank and said right flank of said gear in direction of said grinding stroke, and where the following functions $f_{KL}(z)$, $f_{KR}(z)$, $f_{x,K}(z)$ and $f_{C,K}(z)$, denote in relation to said grinding stroke position z, wherein

| | |
|---|---|
| $f_{KL}(z)$ | The specified deviation corrected tooth trace contour of the left flank (3) relative to a non-corrected tooth trace, |
| $f_{KR}(z)$ | The specified deviation corrected tooth trace contour of the right flank (4) relative to a non-corrected tooth trace, |
| $f_{X,K}(z)$ | A locus of a centre distance alteration between the grinding worm and the gear (1) performed by means of the supplementary motion of the NC axes, and |
| $f_{C,K}(z)$ | A locus of a rotation of the grinding worm relative to the gear (1) within a generative coupling performed by means of the supplementary motion of the NC axes |

\* \* \* \* \*